Dec. 12, 1950          B. W. KING          2,533,321

VARIABLE PITCH PROPELLER

Filed Sept. 12, 1944          7 Sheets-Sheet 2

INVENTOR
BERTELL W. KING
BY
ATTORNEYS

Dec. 12, 1950  B. W. KING  2,533,321
VARIABLE PITCH PROPELLER
Filed Sept. 12, 1944  7 Sheets-Sheet 3

INVENTOR
BERTELL W. KING
ATTORNEYS

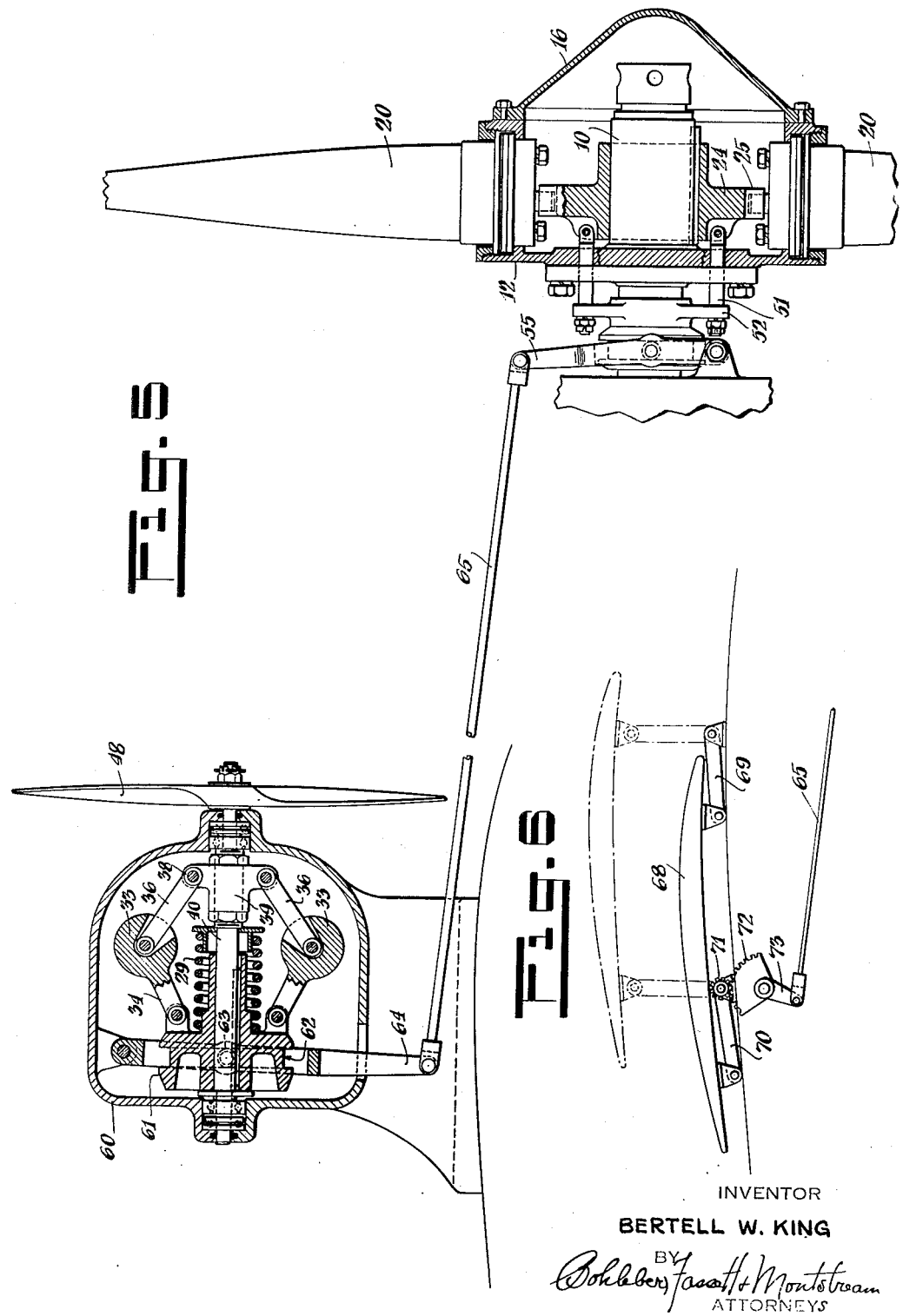

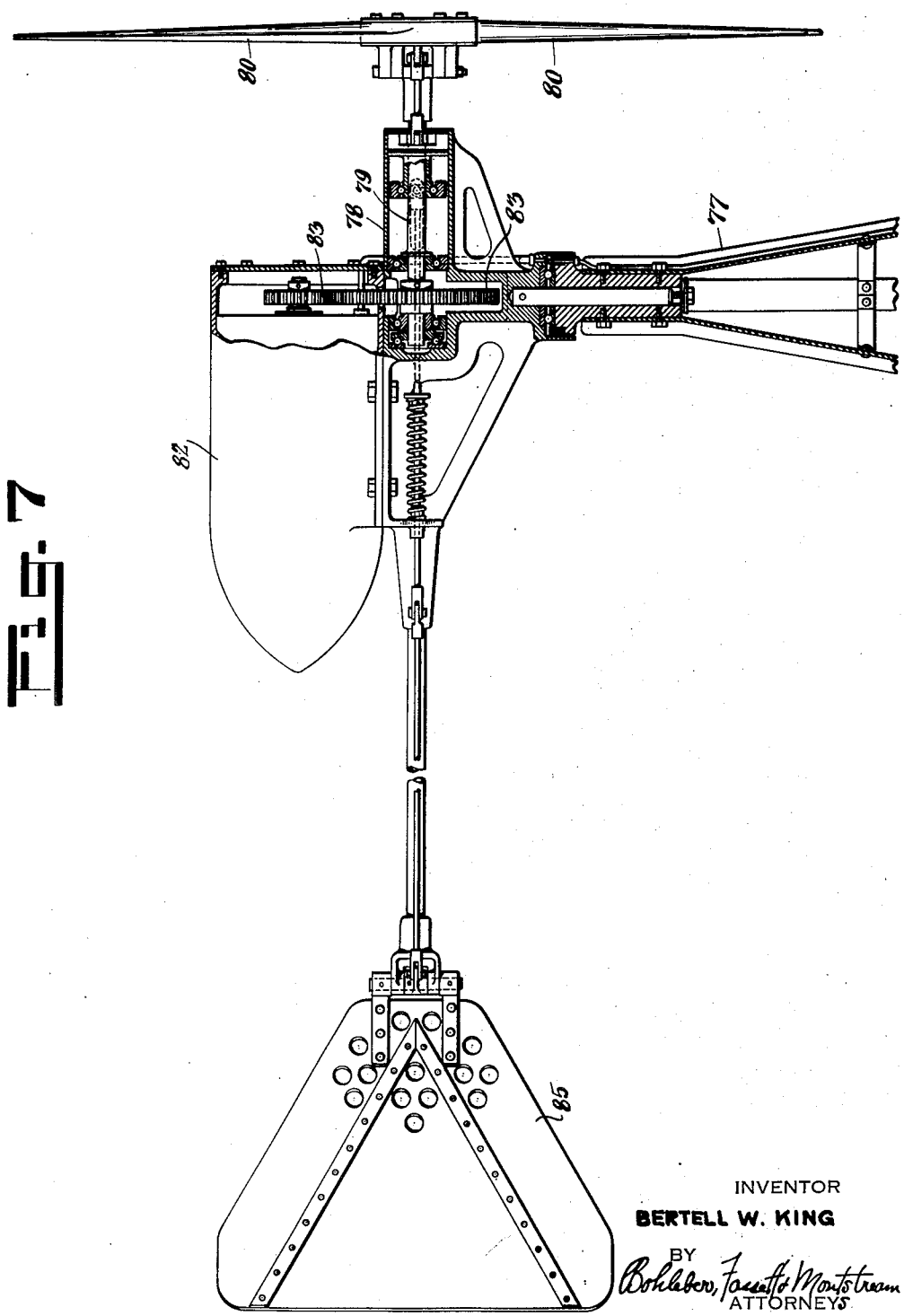

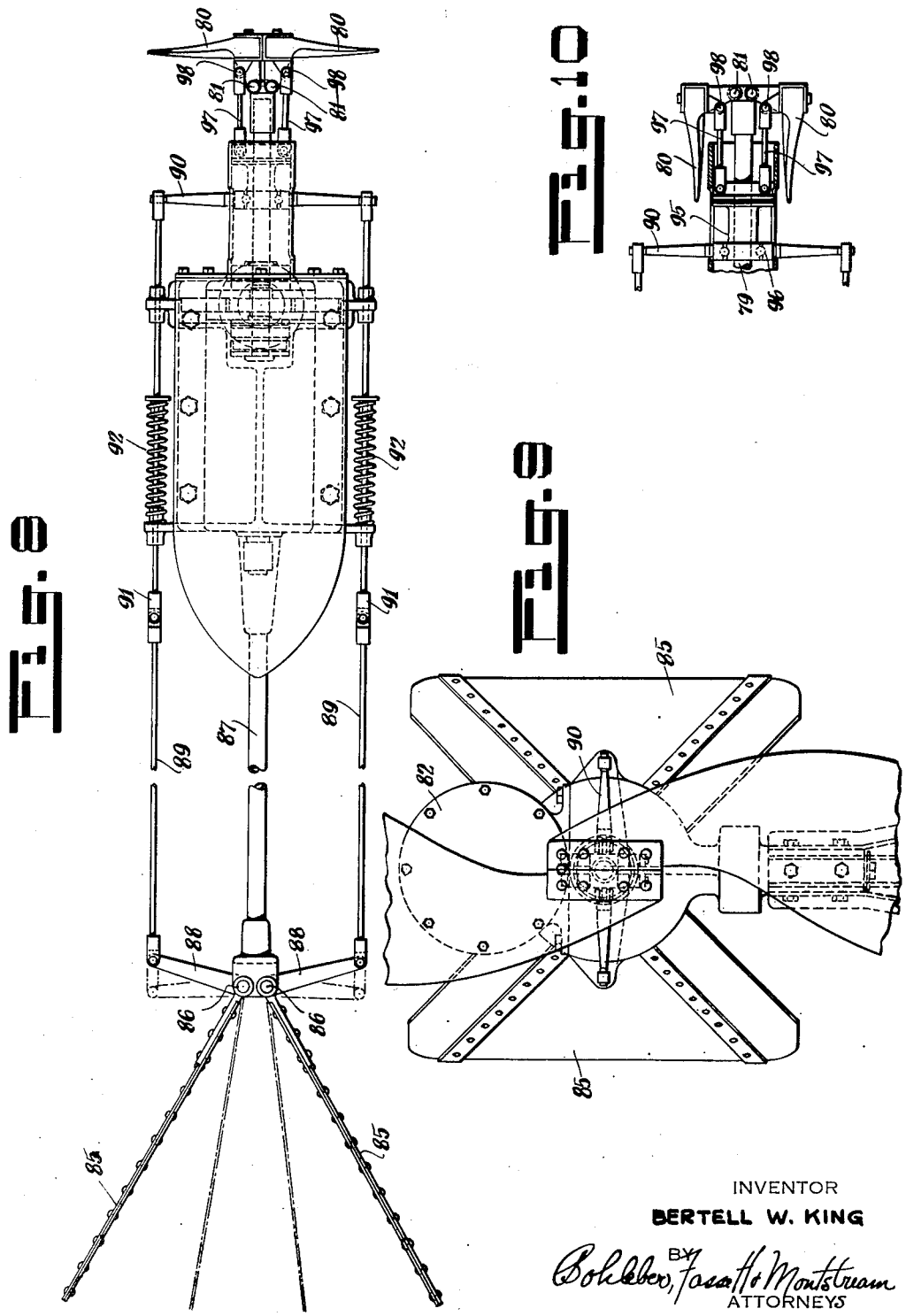

Dec. 12, 1950 B. W. KING 2,533,321
VARIABLE PITCH PROPELLER
Filed Sept. 12, 1944 7 Sheets-Sheet 7
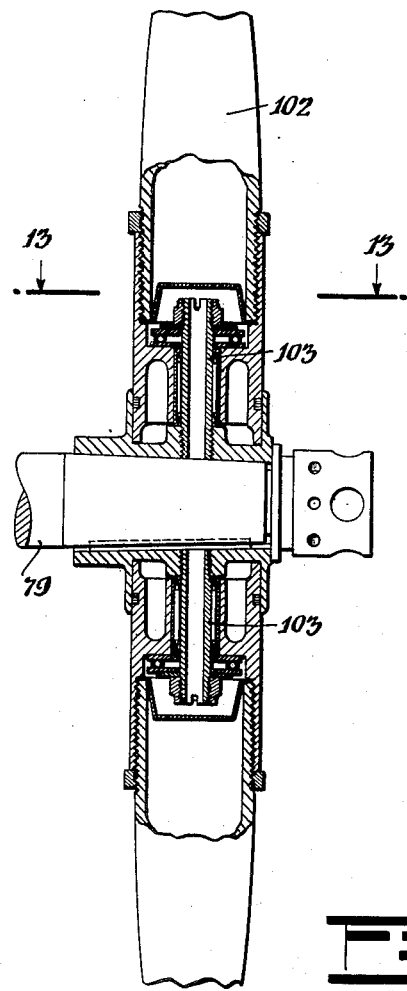
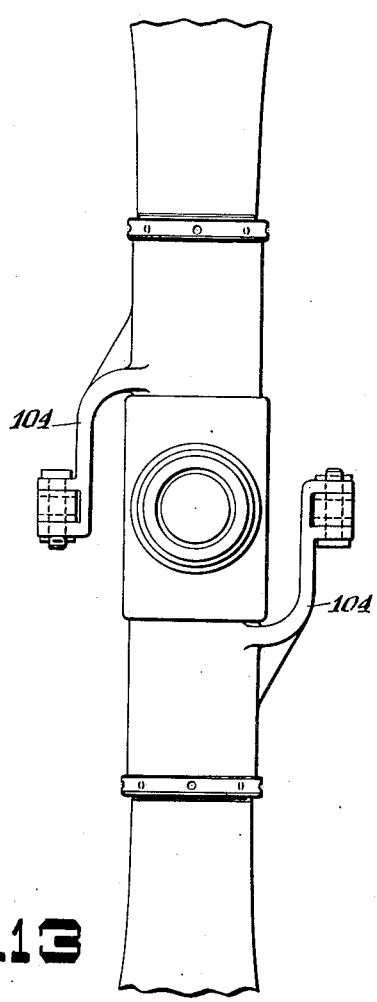
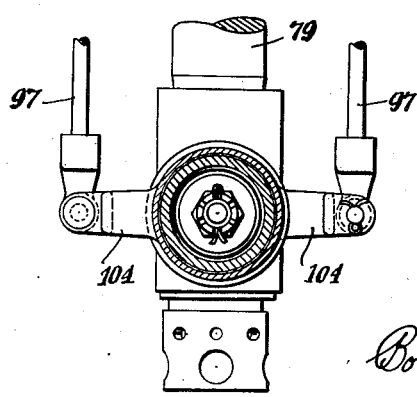
INVENTOR
BERTELL W. KING
ATTORNEYS

Patented Dec. 12, 1950

2,533,321

UNITED STATES PATENT OFFICE 2,533,321

VARIABLE PITCH PROPELLER

Bertell W. King, Brooklyn, N. Y.

Application September 12, 1944, Serial No. 553,682

8 Claims. (Cl. 170—160.15)

The invention relates to a variable pitch propeller whereby the angular position or pitch of the propeller blades is adjusted in accordance with the velocity or speed of the wind stream. The invention has applicability to the propeller of an airplane where the windstream arises from a forward movement of the plane and also to the propeller of a windmill which is fixed or stationary and the propeller is adjusted in accordance with the velocity of the wind passing the windmill.

It is an object of the invention to construct a propeller the angular position or pitch of the blades of which are adjusted in accordance with the velocity of windstream.

Another object of the invention is to construct a variable pitch propeller in which the angle or pitch of the blades is adjusted in accordance with the windstream by utilizing an auxiliary propeller which is mounted in a manner to give wide spacing between its bearings.

Another object is to construct a novel propeller for a windmill.

Another object is to construct a variable pitch propeller in which one adjusting mechanism may be utilized to automatically adjust the pitch or angular position of the blades of more than one propeller.

Other objects of the invention will be more apparent from the following description taken in connection with the accompanying drawings which illustrate several embodiments of the invention in which:

Figure 5 shows a construction in which the automatic adjusted mechanism for the propeller is mounted remotely from the propeller.

Figure 6 shows an airfoil construction for automatically adjusting the pitch of the propeller blades.

Figure 7 shows a windmill with mechanism for automatically adjusting the pitch of the blades by the windspeed.

Figure 8 is a top view of the windmill construction.

Figure 9 is an end view of the windmill.

Figure 10 is a view of reduced size showing the windmill blades completely retracted or feathered.

Figure 11 shows a different form of windmill propeller which is adapted to utilize the automatic variable pitch adjusting mechanism.

Figure 12 is a front view of the propeller of Figure 11.

Figure 13 is a section through the propeller taken on line 13—13 of Figure 11 which shows the connection of the propeller blades with the adjusting mechanism.

Figure 1:
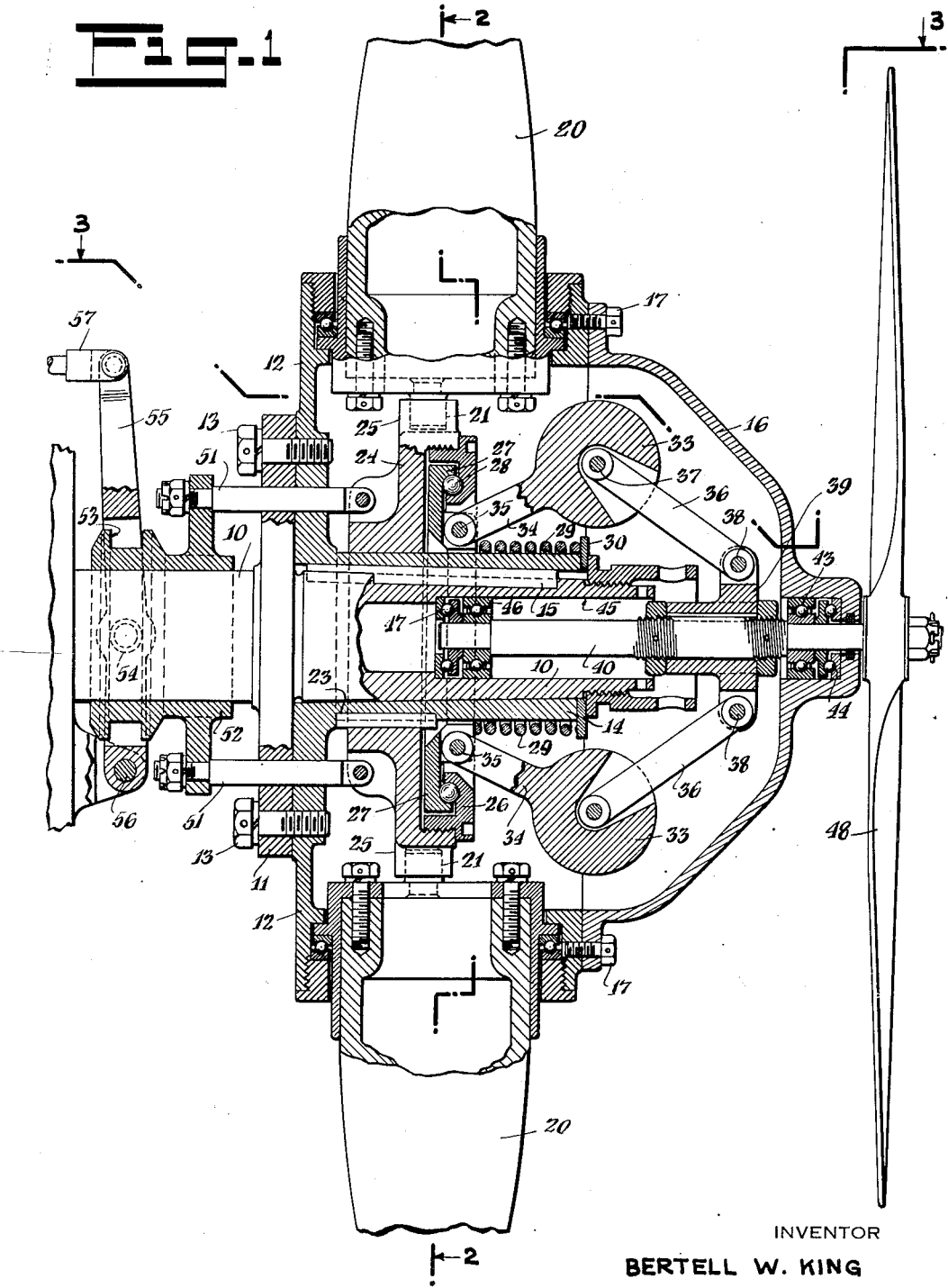
Figure 1 is a vertical section through the central housing of the propeller showing the automatic mechanism for automatically adjusting the pitch of the blades.
Figure 2:
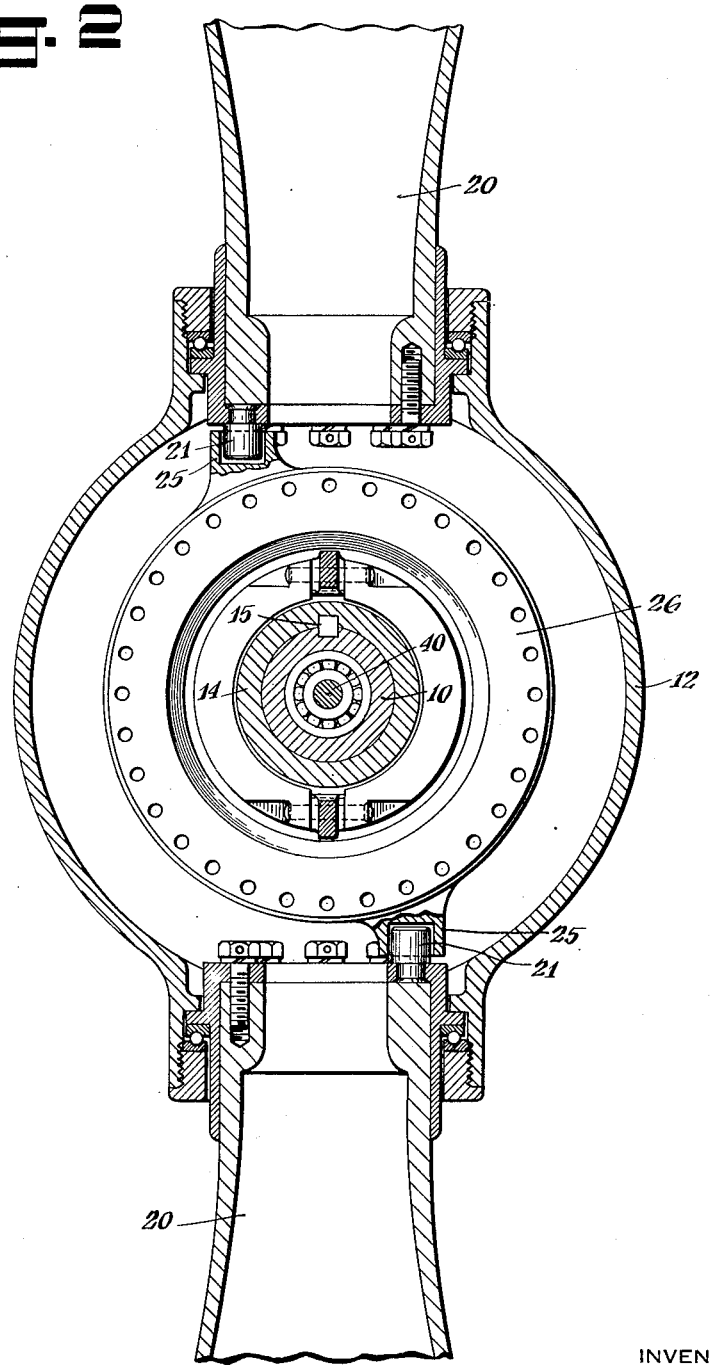
Figure 2 is a cross section through the central housing of the propeller taken on line 2—2 of Figure 1 and showing particularly the connection between the adjusting means and the propeller.
Figure 3:
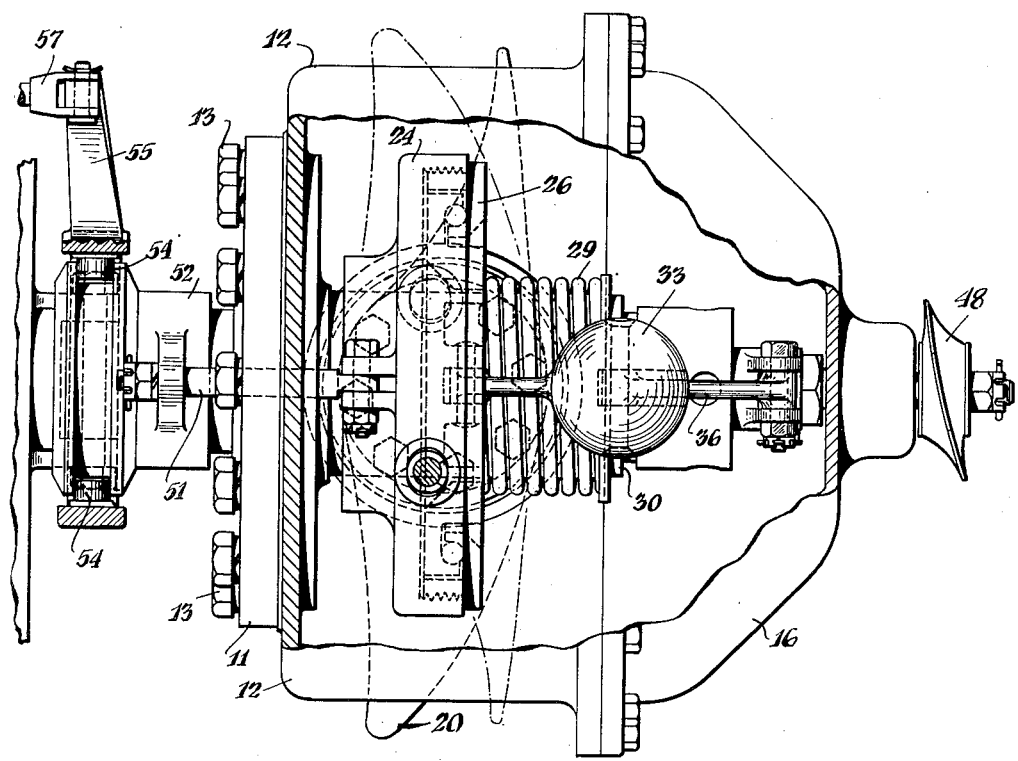
Figure 3 is a section through a portion of the housing of the propeller taken on the line 3—3 of Figure 1 and shows a top view of the centrifugal adjusting mechanism.

Automatic adjustment of the pitch of a propeller blade has been accomplished by utilizing the speed of rotation of the propeller. When the propeller rotates faster or slower the pitch is changed in accordance with the speed of rotation. The object of such automatic adjustment of the pitch of the propeller blade is to maintain speed of rotation constant. In other words when the speed of the propeller increases, the pitch increases to give the blade a greater bite and hence slow down the rotation. Similarly when the R. P. M. decreases then the pitch is decreased thereby decreasing the bite and hence speeding up the rotation to the desired constant R. P. M. Such propellers also function only after the speed of rotation has increased or decreased whereas the propeller blades of the invention will change its pitch even though the speed of rotation of the propeller has had no change whatever.

The propeller is mounted upon a propeller shaft 10 which is adapted to be connected with and driven by a motor. The propeller shaft may carry a flange 11 to which the propeller housing 12 is secured in any suitable fashion such as by the bolts 13. The housing includes a hub 14 which is keyed through a key 15 to the propeller shaft 10. The housing also includes a cover 16 for closing the open end of the housing and the two portions of the housing are secured together by suitable bolts 17.

The housing supports propeller blades 20 for angular adjustment thereupon. The propeller blades may be mounted in any suitable fashion so that they are movable angularly about their axis, the particular form of the blade mounting being no part of the invention. Each propeller blade carries an eccentrically mounted pin or stud 21 through which adjustment of the pitch of the propeller blade is accomplished.

Adjusting means is slidably mounted upon the hub 14 of the housing and includes an adjusting flange 24 having a socket 25 for each pin or stud 21 which is received within the socket. The flange 24 is keyed to the housing through the key 23 for rotation therewith and yet permit axial movement of the adjusting means. A closure 26 is secured to the adjusting flange such as by screw threads. The adjusting means provides a mounting for a freely rotatable carrier 27 having ball bearings 28 to permit rotation of the carrier within the adjusting means independently of the rotation of the propeller or housing. A compression spring 29 has one end abutting against a ring 30 and the other end engages the adjusting means to impel the same to the left as shown in Figure 1.

Centrifugal means are secured to the carrier 27 which includes the weights 33 having an arm 34 which is connected with the carrier 27 through the pivot pin 35. Each weight is connected with a link 36 which is pivotally secured to the weight by a pivot pin 37 and the other end of each link is connected by a pivot pin 38 to a bracket 39 mounted upon a shaft 40.

The shaft 40 is mounted for rotation upon the propeller such as upon suitable ball bearings 43 and 44 carried by the cover 16. In order to provide a long bearing support for the shaft 40 the end of the propeller shaft 10 carries a bore 45 into which the shaft 40 projects and is supported at this end by bearings 46 and 47. Upon the shaft 40 is secured an auxiliary propeller or impeller 48.

The pitch or angular position of the blades may be adjusted manually if desired. This may be accomplished by connecting the adjusting means or particularly the adjusting flange 24 to the pull rods 51 which extend through the housing 12. The exterior end of the pull rods are secured to a sliding member 52 mounted for axial movement upon the propeller shaft 10. The sliding member carries a circular groove 53 within which are rollers 54 carried by an adjusting lever 55 which is pivoted on the pin 56 carried by a fixed part of the plane. A connecting link 57 extends to the cockpit so that the pitch of the propeller may be manually adjusted thereby.

The auxiliary propeller 48 is rotated by the windstream which is created by the forward movement of the plane and its speed of rotation varies with the velocity of the windstream and hence the forward movement of the plane. The propeller rotates the centrifugal weights 33 which are thrown outwardly depending upon the speed of rotation of the auxiliary propeller. Since the centrifugal weights 33 are freely rotatable with respect to the housing and propeller shaft they are rotated solely by the auxiliary propeller and the propeller itself does not influence in any way the rotation of the centrifugal means. As the weights are thrown outwardly the adjusting means is pulled to the right against the compression of the spring 29. This movement of the adjusting means is transferred to the propeller blades through the socket 25 and eccentric pin connection 21. The propeller blades 20 are therefore adjusted to a position depending upon the forward movement of the plane and independently of the speed of the propeller.

The centrifugal adjusting means need not be mounted in close proximity to the propeller nor need it be mounted within the propeller housing as illustrated in Figures 5 and 6. In Figure 5 an adjusting means housing 60 may be mounted remotely from the propeller such as on the fuselage or wing of the plane. A single adjusting means may therefore be used to adjust the pitch of a plurality of propellers which constitute propeller means. In this separate or remote mounting for the centrifugal adjusting means like parts are numbered with the same numerals as the parts of the construction of Figure 1. The axial movement of the adjusting means or the radial movement of the centrifugal means is transmitted to a carrier 61 slidably mounted upon the auxiliary propeller shaft 40. The carrier carries a groove 62 in which is received a roller 63 carried by a fork or lever 64 which is connected by a link 65 to the adjusting lever 55. Movement of the lever 55 shifts the position of the sliding member 52 upon the propeller shaft 10 and through the pull rods 51 transmits this motion to the adjusting flange 24 which is slidably mounted upon the propeller shaft 10 within the propeller housing 12. The pitch of the propeller blades 20 are varied through the pin and socket connection 25 and 21. The adjusting lever 55 in the construction of Figures 1 through 4 was used for manual control of the propeller. However, the same mechanism is suitable for automatic control from a remotely located automatic mechanism such as illustrated in Figures 5 and 6. It is to be understood that any form of connection between the remotely positioned adjusting means and the propeller is contemplated and may be hydraulic if desired.

The adjustment of the pitch of the propeller blades 20 need not be by centrifugal adjusting mechanism as illustrated in Figure 6. In this figure an airfoil 68 is mounted upon a wing or fuselage of the plane which is movable vertically upon links 69 and 70 pivotally secured to the airfoil and to the wing or fuselage. The connection between the airfoil and the propeller may be of any suitable kind that illustrated including a gear 71 carried by the pivot for one of the links such as link 70 which meshes with a segmental gear 72 to which is connected a lever 73. The lever 73 may be connected to a connecting link 65 to the adjusting means 24 illustrated in Figure 5.

The vertical position of the airfoil 68 is determined by the airstream and hence by the speed of forward movement of the plane. At high speed the airfoil assumes the dot dash position shown in Figure 6 which gives maximum adjustment of the propeller blades 20. At lower speeds the airfoil assumes a lower position and adjusts the pitch of the propeller blades 20 accordingly.

The principle and construction of the invention is applicable to windmills as shown in Figures 7 through 13. The windmill may be supported upon a tower 77. The tower supports a housing 78 in which is rotatably mounted a propeller shaft 79. The propeller is secured to the shaft and has propeller blades 80 which may be adjustable as to their angular position or pitch in any suitable fashion. In the construction shown in Figure 8 each blade is mounted upon a pivot 81 spaced from the axis of the propeller shaft and carried by the shaft. The housing is rotatable and pivoted upon the tower so that the propeller can turn into the wind. The housing carries an electrical generator 82, which also may serve as a directing vane and is connected to the propeller shaft such as by gearing 83 for directing the propeller into the wind. It is important that the generator be driven at a substantially constant speed.

The adjusting means for automatically adjusting the angular position or pitch of the windmill blades 80 include a pair of wind plates 85 which are supported upon the pivots 86 carried by a rearwardly extending bar 87 which is secured to the housing. A lever 88 is secured to each pivot and a connecting link 89 connects each lever with a pull bar 90. A universal joint 91 may be provided in each connecting link. A compression spring 92 normally tends to move the wind plates 85 to their outermost position. The pull bar 90 is secured to a pull sleeve 95 which is axially movable upon and with respect to the propeller shaft 79. A ball bearing 96 permits rotation of the pull sleeve 95 with respect to the pull bar 90. The pull sleeve is connected by links 97 to a pivot 8 carried by each propeller blade. Movement of the pull sleeve 95 to the left rotates, or adjusts the pitch of, each propeller blade about its pivot 81. In the position shown in Figure 4, the propeller blades 80 are fully feathered. With a propeller blade which is pivoted on a pin which is eccentric with respect to the propeller shaft it is desirable to have the blade extend angularly so that its center of gravity is radially of the axis of rotation that is of the propeller shaft so that there will be no centrifugal force exerted by the blade tending to resist the pitch adjusting movement exerted by the wind vanes or plates 85.

Figure 4:
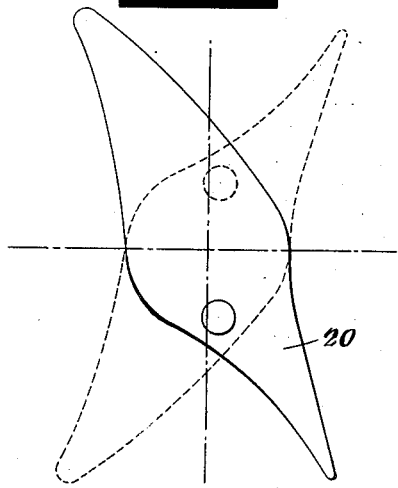
Figure 4 illustrates the angle of adjustment of a propeller blade.

If a light breeze is blowing there is no pressure upon the wind plates 85 so that the springs 92 impel the pull bar 90 to its extreme right-hand position as shown in Figure 8 in which position the blades 80 of the proller are fully presented to the breeze. For a wind of greater strength or velocity the wind plates 85 are forced towards their dot dash position against the compression of the springs 92. The connecting links 89 and the pull bar 90 are moved to the left which adjusts the pitch of the propeller blades 80 in accordance with the velocity of the wind. For a very great velocity of wind, wind plates 85 move to a substantially parallel position so that the propeller blades 80 are moved to a fully feathered position as shown in Figure 4. The angular position or pitch of the blades of the propeller are therefore adjusted in accordance with the velocity of the windstream, even though the propeller itself is not moving forward as in the airplane propeller construction, and it is the velocity of the wind which determines the adjustment of the pitch of the propeller blades.

In Figures 11 through 13 is shown a windmill propeller in which the propeller blades 102 are mounted for angular adjustment about the axis 103 of the blade. Any suitable mounting for permitting angular movement of the blade may be provided. Projecting from each blade is a bracket 10 to each of which is secured the connecting link 97 for connecting the same with the wind plates 85 through the mechanism described in connection with Figure 8. The pitch of the propeller blades in Figures 11 through 13 is adjusted in accordance with the velocity of the wind in the same manner that the propeller blades of Figures 7 through 10 are adjusted.

This invention is presented to fill a need for improvements in a Variable Pitch Propeller. It is understood that various modifications in structure, as well as changes in mode of operation, assembly, and manner of use, may and often do occur to those skilled in the art, especially after benefitting from the teachings of an invention. Hence, it will be understood that this disclosure is illustrative of preferred means of embodying the invention in useful form by explaining the construction, operation and advantages thereof.

What is claimed is:

1. A variable pitch propeller for an airplane comprising a housing, blades carried by the housing and mounted for adjustment of the angular position of the blades, centrifugal means having at least one weight mounted for rotation and for movement radially with changes in its speed of rotation, an auxiliary propeller mounted to be driven by the airstream created by the forward motion of the plane and connected with the centrifugal means to rotate the same, and mechanical means connecting the centrifugal means with the propeller blades to adjust the angular position thereof.

2. A variable pitch propeller for an airplane comprising a housing, blades carried by the housing and mounted for adjustment of the angular position of the blades, centrifugal means having at least one weight mounted within the housing for rotation and for movement radially with changes in its speed of rotation, an auxiliary propeller mounted upon the housing to be driven by the airstream created by the forward motion of the plane and connected with the centrifugal means to rotate the same, and means connecting the centrifugal means with the propeller blades to adjust the angular position thereof.

3. A variable pitch propeller for an airplane comprising a housing, blades carried by the housing and mounted for adjustment of the angular position of the blades, centrifugal means having at least one weight mounted for rotation and for movement radially with changes in its speed of rotation and adapted to be carried by the plane remotely from the housing and propeller, an auxiliary propeller mounted to be driven by the airstream created by the forward motion of the plane and connected with the centrifugal means to rotate the same, and means connecting the centrifugal means with the propeller blades to adjust the angular position thereof.

4. A variable pitch propeller for an airplane comprising a housing, blades carried by the housing and mounted for adjustment of the angular position of the blades, centrifugal means having at least one weight carried within the housing and mounted for rotation independently of the rotation of the propeller and for movement radially with changes in its speed of rotation, an auxiliary propeller mounted to be driven by the airstream created by the forward motion of the plane and connected with the centrifugal means to rotate the same, and means connecting the centrifugal means with the propeller blades to adjust the angular position thereof.

5. A variable pitch propeller for an airplane adapted to be carried by a propeller shaft having a bore therein, comprising a housing adapted to be secured to the propeller shaft, blades carried by the housing and mounted for adjustment of the angular position of the blades, a cover for the housing, centrifugal means having at least one weight carried within the housing and mounted for rotation independently of the rotation of the propeller and for movement radially with changes in its speed of rotation, an auxiliary propeller mounted in the cover and the bore of the propeller shaft to be driven by the airstream created by the forward motion of the plane and connected with the centrifugal means to rotate the same, and means connecting the centrifugal means with the propeller blades to adjust the angular position thereof.

6. A variable pitch propeller for an airplane to be mounted upon the propeller shaft comprising a housing having a hub to receive the propeller shaft, blades carried by the housing and mounted for adjustment of the angular position of the blades, adjusting means movable axially of the hub and connected with the propeller blades to adjust the angular position thereof, a freely rotatable carrier mounted upon the adjusting means, an auxiliary propeller means carried by the housing including a propeller mounted to be driven by the airstream created by the forward motion of the plane, centrifugal means having at least one weight connected with the carrier and the auxiliary propeller means for rotation independently of the rotation of the propeller and for movement radially with changes in its speed of rotation, and spring means opposing the action of the centrifugal means.

7. A variable pitch propeller for an airplane to be mounted upon the propeller shaft having a central bore, comprising a housing having a hub to receive the propeller shaft, blades carried by the housing and mounted for adjustment of the angular position of the blades, adjusting means movable axially of the hub and connected with the propeller blades to adjust the angular position thereof, a freely rotatable carrier mounted upon the adjusting means, an auxiliary propeller shaft mounted in the housing and the central bore of the propeller shaft, an auxiliary propeller mounted upon the shaft outside of the housing to be driven by the airstream created by the forward motion of the plane, centrifugal means having at least one weight connected with the carrier and the auxiliary propeller shaft for rotation independently of the rotation of the propeller and for movement radially with changes in its speed of rotation, and spring means opposing the action of the centrifugal means.

8. A variable pitch propeller mechanism for an airplane to be mounted upon the propeller shaft comprising propeller means including a housing having a hub to receive a propeller shaft, blades carried by the housing and and mounted for adjustment of the angular position of the blades, adjusting means movable axially of the hub and connected with the propeller blades to adjust the angular position thereof, an auxiliary propeller means carried by the plane remotely from the propeller means including a propeller mounted to be driven by the airstream created by the forward motion of the plane, centrifugal means having at least one weight connected with the auxiliary propeller means for rotation thereby and mounted for movement radially with changes in its speed rotation, spring means opposing the action of the centrifugal means, and means connecting the centrifugal means with the adjusting means to vary the pitch of the propeller blades.

BERTELL W. KING.

REFERENCES CITED

The following references are of record in the file of this patent:

UNITED STATES PATENTS

| Number | Name | Date |
|---|---|---|
| 261,686 | Cornell | July 25, 1882 |
| 367,517 | Haldan | Aug. 2, 1887 |
| 963,335 | Swanstrom | July 5, 1910 |
| 1,374,787 | Walker | Aug. 12, 1921 |
| 1,425,922 | Wesnick | Aug. 15, 1922 |
| 1,874,053 | Lambert | Aug. 30, 1932 |
| 1,877,622 | Beard | Sept. 13, 1932 |
| 1,908,894 | Findley | May 16, 1933 |
| 1,963,664 | Lambert | June 19, 1934 |
| 2,039,720 | Lambert | May 5, 1936 |
| 2,141,552 | Ratie | Dec. 27, 1938 |
| 2,358,967 | Everts | Sept. 26, 1944 |